US012690624B2

(12) United States Patent
   Kim et al.

(10) Patent No.: US 12,690,624 B2
(45) Date of Patent: Jul. 28, 2026

(54) AEROSOL GENERATING DEVICE

(71) Applicant: KT&G CORPORATION, Daejeon (KR)

(72) Inventors: Dong Sung Kim, Seoul (KR); Young Bum Kwon, Gyeonggi-do (KR); Yong Hwan Kim, Gyeonggi-do (KR); Hun Il Lim, Seoul (KR); Seok Su Jang, Daejeon (KR)

(73) Assignee: KT&G Corporation, Daejeon (KR)

( * ) Notice: Subject to any disclaimer, the term of this patent is extended or adjusted under 35 U.S.C. 154(b) by 433 days.

(21) Appl. No.: 18/563,154

(22) PCT Filed: Nov. 9, 2022

(86) PCT No.: PCT/KR2022/017508
   § 371 (c)(1),
   (2) Date: Nov. 21, 2023

(87) PCT Pub. No.: WO2023/085750
   PCT Pub. Date: May 19, 2023

(65) Prior Publication Data
   US 2024/0237755 A1     Jul. 18, 2024

(30) Foreign Application Priority Data

Nov. 11, 2021   (KR) ........................ 10-2021-0155181
   Feb. 16, 2022   (KR) ........................ 10-2022-0020207

(51) Int. Cl.
   *A24F 40/53*      (2020.01)
   *A24F 40/40*      (2020.01)
   (Continued)

(52) U.S. Cl.
   CPC .............. *A24F 40/53* (2020.01); *A24F 40/40* (2020.01); *A24F 40/57* (2020.01); *G01D 5/14* (2013.01); *A24F 40/465* (2020.01); *H05B 6/105* (2013.01)

(58) Field of Classification Search
   CPC ........ A24F 40/20; A24F 40/40; A24F 40/465; A24F 40/53; A24F 40/57; A24F 40/60;
   (Continued)

(56) References Cited

U.S. PATENT DOCUMENTS 5,938,472 A * 8/1999 Yuen .................. H01R 13/6658
                                                         439/509
   8,589,703 B2 * 11/2013 Lee ......................... G06F 21/86
                                                         257/922
   (Continued)

FOREIGN PATENT DOCUMENTS

CN      112826137 A * 5/2021 ............. A24F 40/46
   GB      2 560 090 A      8/2018
   (Continued)

OTHER PUBLICATIONS

Machine translation of Zhou et al. Chinese Patent Document CN 112826137 A May 2021 (Year: 2021).*
   (Continued)

*Primary Examiner* — Kevin J Comber
(74) *Attorney, Agent, or Firm* — Foley & Lardner LLP

(57)                ABSTRACT

An aerosol generating device may include a housing including an accommodating space for accommodating an aerosol generating article, and a heater configured to heat the aerosol generating article, a cover coupled to at least one area of the housing and including a conductive pad, a printed circuit board disposed in an internal space formed by the housing and the cover, an electrical connection member electrically connecting the conductive pad and the printed circuit board (Continued)

10 to each other, and a breaking structure arranged on at least one area of the cover and configured to damage the electrical connection member when the cover is detached from the housing.

15 Claims, 11 Drawing Sheets

(51) Int. Cl.

| | |
|---|---|
| *A24F 40/57* | (2020.01) |
| *G01D 5/14* | (2006.01) |
| *A24F 40/465* | (2020.01) |
| *H05B 6/10* | (2006.01) |

(58) Field of Classification Search
CPC . G01D 5/14; H05B 6/06; H05B 6/105; H05B 6/36
USPC .......................................................... 361/115
See application file for complete search history.

(56) References Cited

U.S. PATENT DOCUMENTS

| | | | |
|---|---|---|---|
| 2018/0070636 A1 | 3/2018 | Ruscio et al. | |
| 2018/0110940 A1 | 4/2018 | Suzuki et al. | |
| 2022/0110371 A1 | 4/2022 | Depiano et al. | |
| 2022/0225675 A1* | 7/2022 | Bouchuiguir | ........... A24F 40/51 |
| 2023/0240372 A1 | 8/2023 | Dendy et al. | |

FOREIGN PATENT DOCUMENTS

| | | | |
|---|---|---|---|
| KR | 10-2013-0126804 A | 11/2013 | |
| KR | 10-2017-0129704 A | 11/2017 | |
| KR | 10-2019-0036524 A | 4/2019 | |
| KR | 10-2282683 B1 | 7/2021 | |
| WO | 2014/150117 A2 | 9/2014 | |
| WO | 2016/208757 A1 | 12/2016 | |
| WO | WO-2020/225105 A1 | 11/2020 | |
| WO | 2021/069520 A1 | 4/2021 | |

OTHER PUBLICATIONS

International Search Report for PCT/KR2022/017508 dated Feb. 14, 2023.
Written Opinion for PCT/KR2022/017508 dated Feb. 14, 2023.
Extended European Search Report dated Sep. 4, 2024, received in European Patent Application No. 22893170.5.

* cited by examiner

【Figure 1】
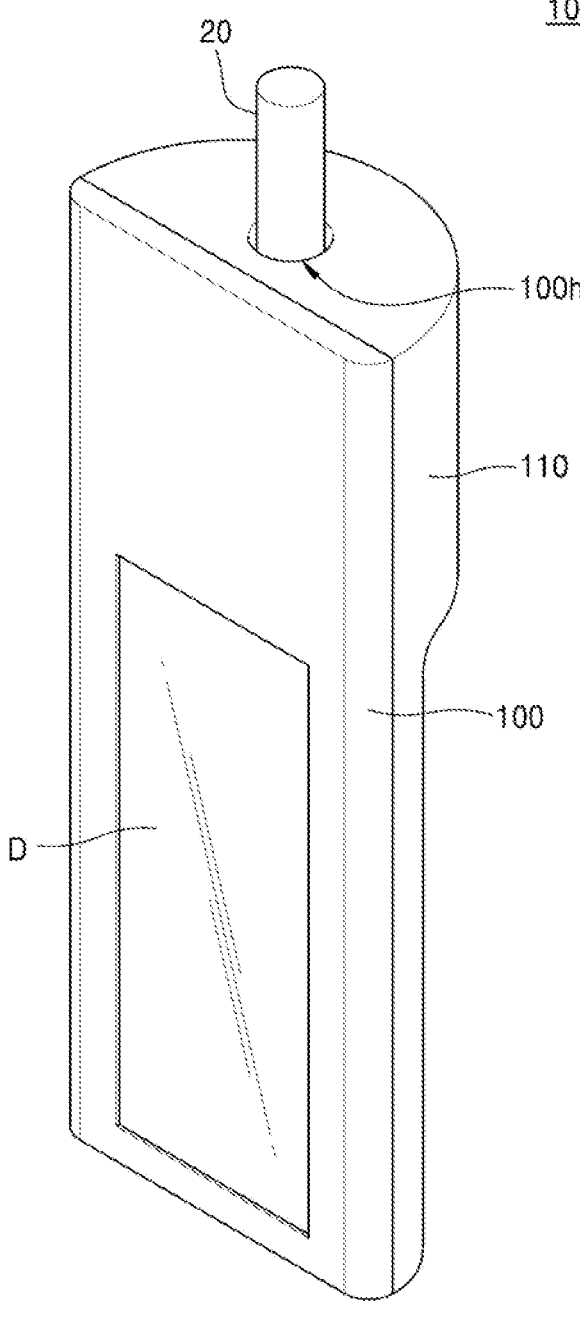

【Figure 2】
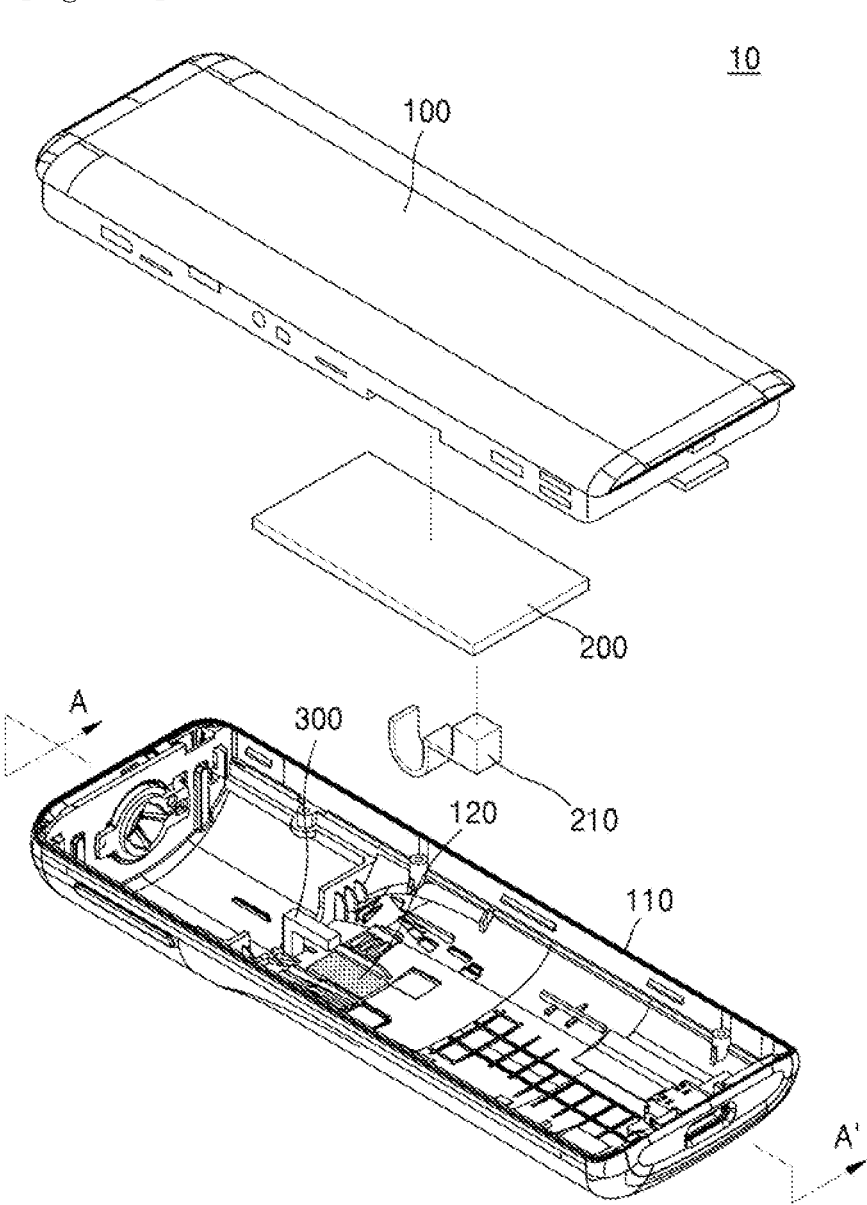

【Figure 3A】
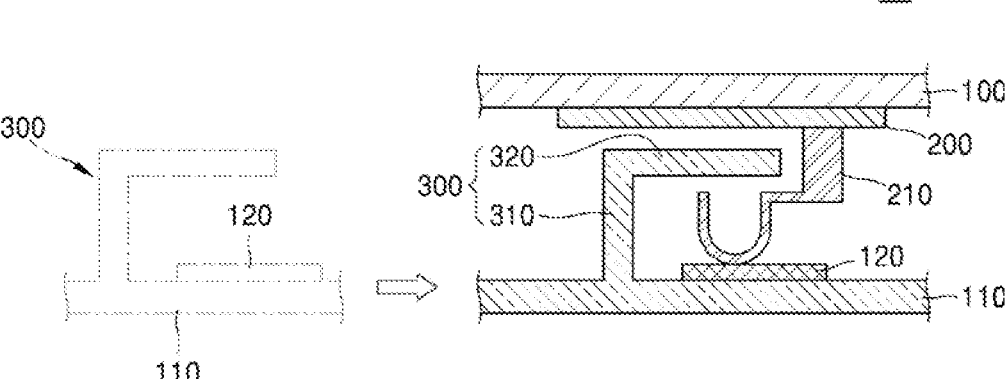

[Figure 3B]
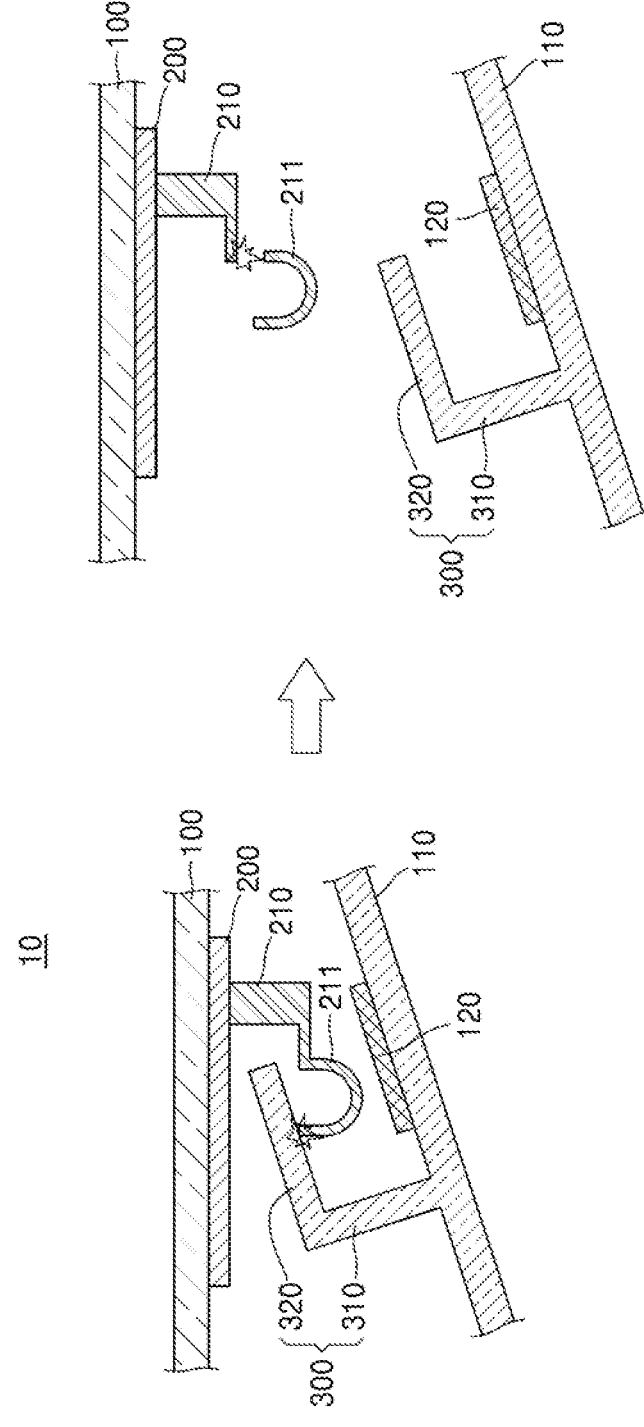

【Figure 3C】
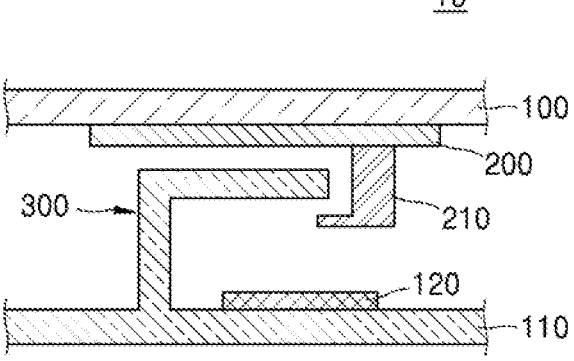

[Figure 4]
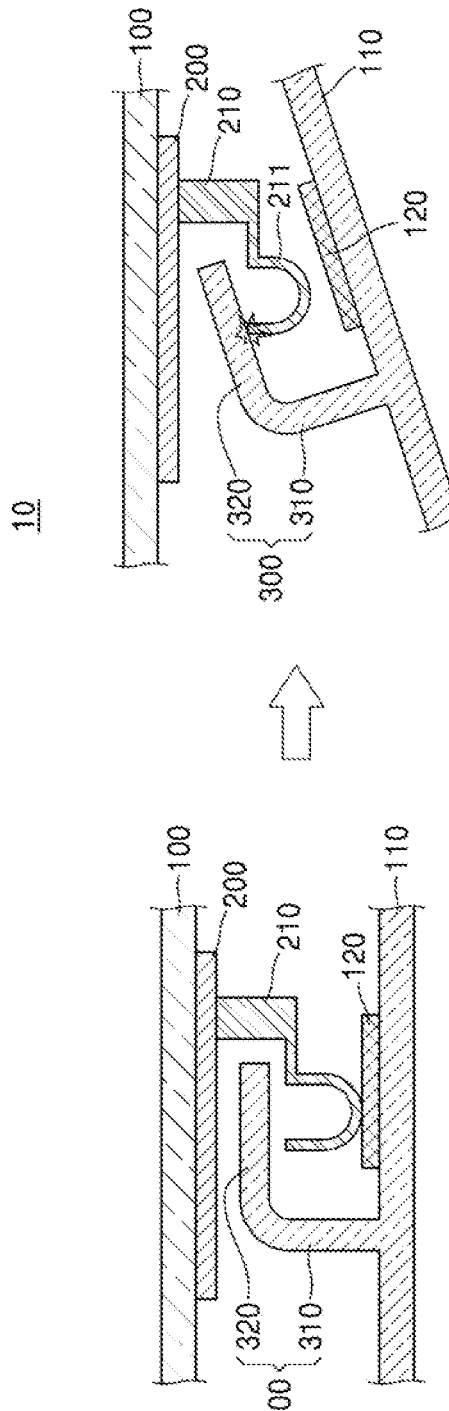

[Figure 5]
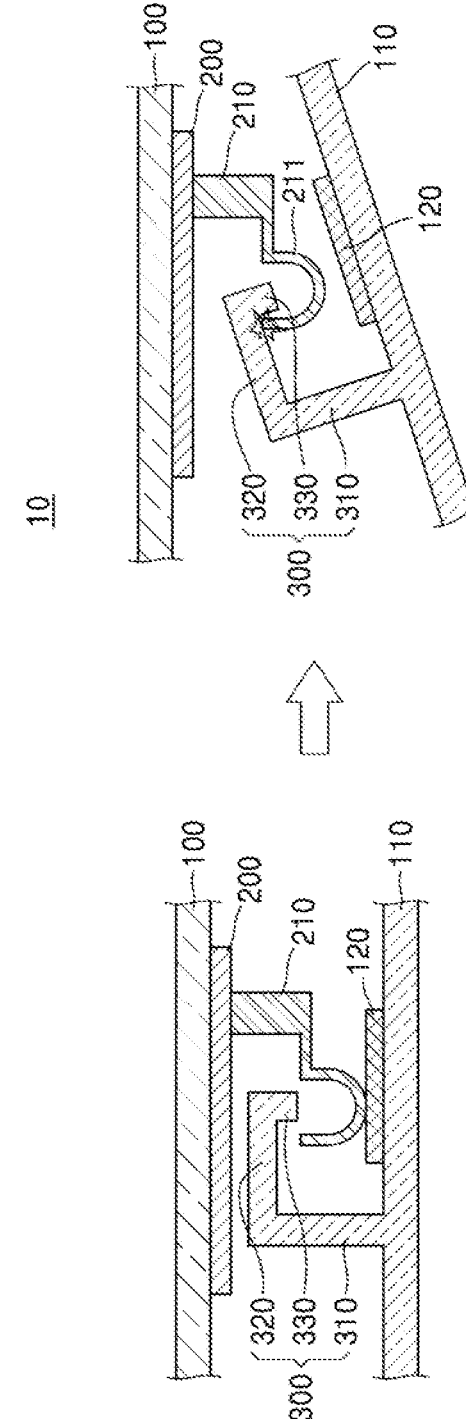

[Figure 6]
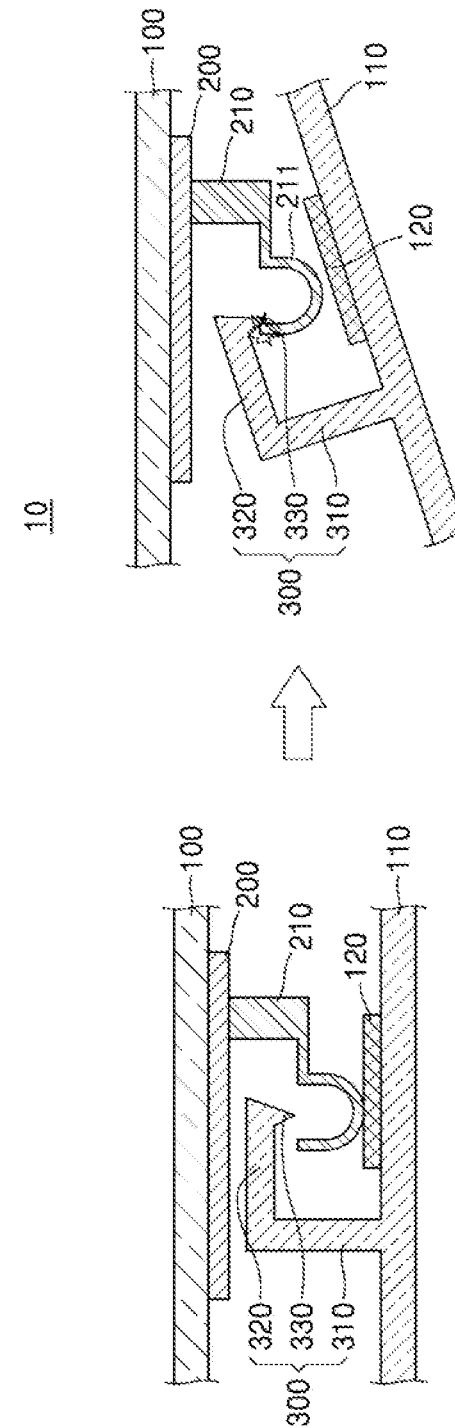

【Figure 7】
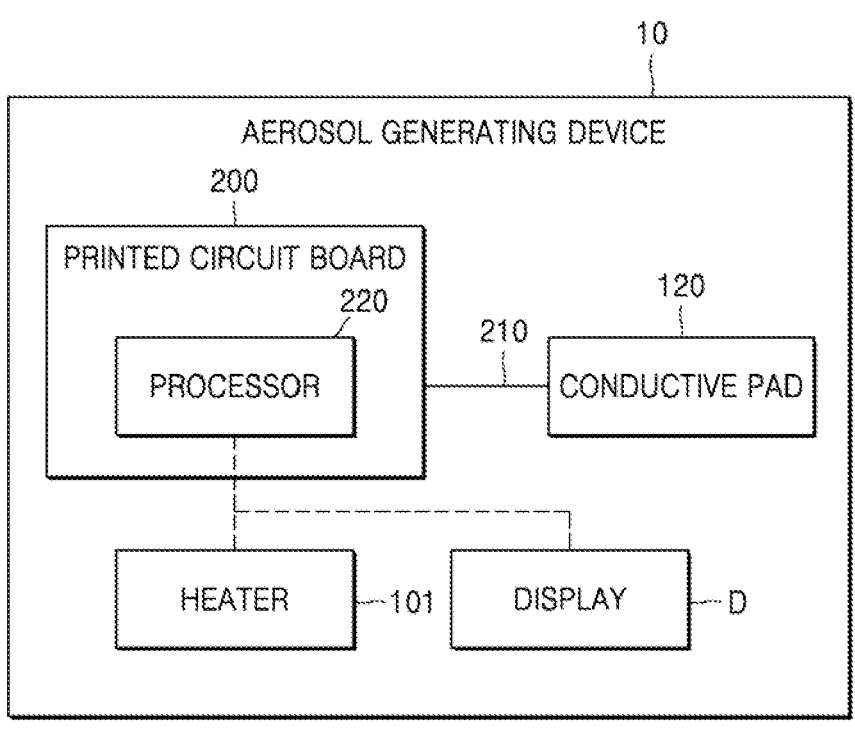

【Figure 8】
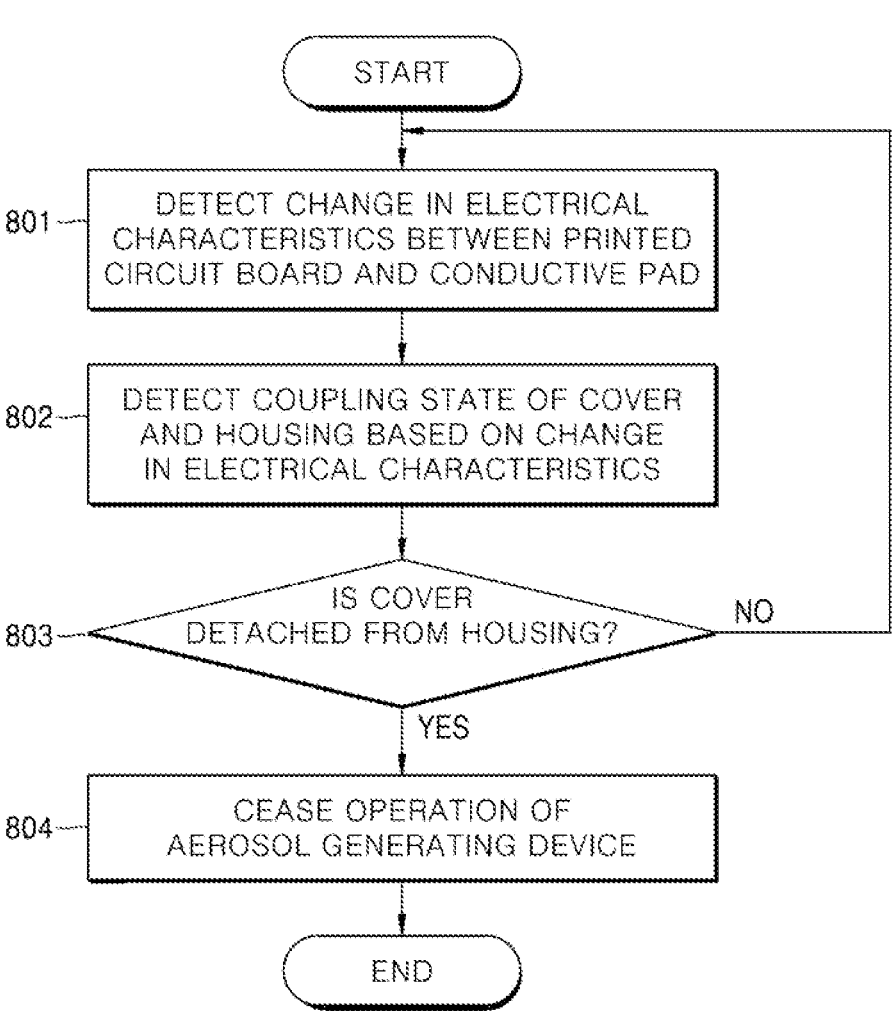

【Figure 9】
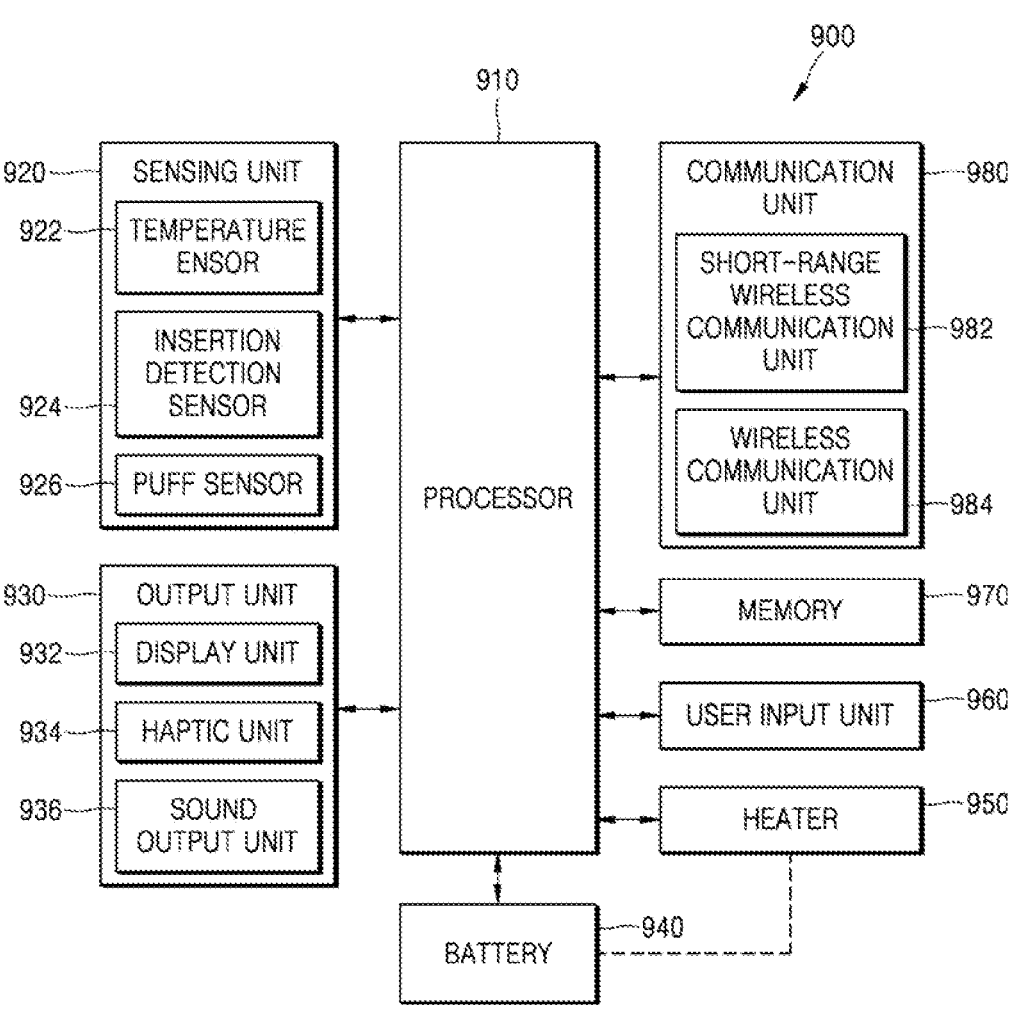

AEROSOL GENERATING DEVICE

This Application is a National Stage of International Application No. PCT/KR2022/017508 filed Nov. 9, 2022, claiming priority based on Korean Patent Application No. 10-2021-0155181 filed Nov. 11, 2021 and Korean Patent Application No. 10-2022-0020207 filed Feb. 16, 2022, the disclosures of which are incorporated by reference herein in their entireties.

TECHNICAL FIELD

One or more embodiments relate to an aerosol generating device, and more particularly, to an aerosol generating device that ceases operation upon detection of arbitrary disassembly of the aerosol generating device by a user.

BACKGROUND ART

Recently, the demand for technology replacing a method of supplying aerosols by burning a cigarette in the related art has increased. For example, studies have been conducted on a method of supplying aerosols having flavors by generating aerosols from an aerosol generating material in a liquid state or a solid state or generating a vapor from an aerosol generating material in a liquid state and then passing the vapor through a fragrance medium in a solid state.

An aerosol generating device may refer to a device capable of generating aerosols by heating an aerosol generating material in a liquid state or a solid state to a certain temperature with a heater.

When an aerosol generating device is used, the smoking convenience of a user may be improved, for example by making smoking possible without additional articles such as a lighter, and allowing the user to smoke as much as they desire. In this regard, research on aerosol generating devices has gradually increased.

DISCLOSURE OF INVENTION

Technical Problem

Manufacturers of aerosol generating devices may maintain the aerosol generating function of an aerosol generating device in an optimal state by setting a temperature profile of a heater based on the characteristics of an aerosol generating article used in the aerosol generating device.

However, recently, users arbitrarily tuning (i.e., 'custom tuning') an aerosol generating device have increased. For example, some users change a temperature profile of a heater or replace a battery after disassembling the aerosol generating device, to increase the amount of aerosol generation or increase the operating time of the aerosol generating device.

In the case of an aerosol generating device which is arbitrarily tuned, safety problems, such as an excessively high temperature rise of a heater or explosion of a battery, may occur during operation, and thus a method of preventing arbitrary tuning by a user is required.

Various embodiments provide an aerosol generating device capable of detecting whether arbitrary disassembly of the aerosol generating device has occurred and ceasing the operation of the aerosol generating device when arbitrary disassembly has occurred, in order to prevent safety accidents caused by arbitrary tuning.

The technical problems to be solved by the embodiments of the disclosure are not limited to the above-described problems, and problems that are not mentioned will be clearly understood by those of ordinary skill in the art from the disclosure and the accompanying drawings.

Solution to Problem

An aerosol generating device according to an embodiment may include a housing including an accommodating space capable of accommodating an aerosol generating article, and a heater configured to heat the aerosol generating article, a cover coupled to at least one area of the housing and including a conductive pad, a printed circuit board disposed in an internal space formed by the housing and the cover, an electrical connection member electrically connecting the conductive pad and the printed circuit board to each other, and a breaking structure arranged on at least one area of the cover and configured to damage the electrical connection member when the cover is detached from the housing.

Advantageous Effects of Invention

An aerosol generating device according to various embodiments may prevent safety accidents caused by arbitrary tuning of the aerosol generating device.

Technical problems to be solved by the embodiments are not limited to the above-described problems, and problems that are not mentioned will be clearly understood by those of ordinary skill in the art from the disclosure and the accompanying drawings.

BRIEF DESCRIPTION OF DRAWINGS

FIG. 1 is a perspective view of an aerosol generating device according to an embodiment.

FIG. 2 is an exploded perspective view of the aerosol generating device shown in FIG. 1.

FIG. 3A is a diagram showing a process in which a cover is coupled to a housing in an aerosol generating device according to an embodiment.

FIG. 3B is a diagram showing a process in which a cover is detached from a housing in an aerosol generating device according to an embodiment.

FIG. 3C is a diagram showing a process in which a detached cover is re-coupled to a housing in an aerosol generating device according to an embodiment.

FIG. 4 is a diagram showing a process in which a cover is detached from a housing in an aerosol generating device according to another embodiment.

FIG. 5 is a diagram showing a process in which a cover is detached from a housing in an aerosol generating device according to another embodiment.

FIG. 6 is a diagram showing a process in which a cover is detached from a housing in an aerosol generating device according to another embodiment.

FIG. 7 is a block diagram showing some components of an aerosol generating device according to an embodiment.

FIG. 8 is a flowchart illustrating a control operation based on whether a cover of the aerosol generating device of FIG. 7 is detached.

FIG. 9 is a block diagram of an aerosol generating device according to another embodiment.

MODE FOR THE INVENTION

With respect to the terms used to describe the various embodiments, general terms which are currently and widely used are selected in consideration of functions of structural elements in the various embodiments of the disclosure.

However, meanings of the terms can be changed according to intention, a judicial precedence, the appearance of new technology, and the like. In addition, in certain cases, terms which can be arbitrarily selected by the applicant in particular cases. In such a case, the meaning of the terms will be described in detail at the corresponding portion in the description of the present disclosure. Therefore, the terms used in the various embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, when an expression such as "at least any one" precedes arranged elements, it modifies all elements rather than each arranged element. For example, the expression "at least any one of a, b, and c" should be construed to include a, b, c, or a and b, a and c, b and c, or a, b, and c.

In an embodiment, an aerosol generating device may be a device that generates aerosols by electrically heating a cigarette accommodated in an interior space thereof.

The aerosol generating device may include a heater. In an embodiment, the heater may be an electro-resistive heater. For example, the heater may include an electrically conductive track, and the heater may be heated when currents flow through the electrically conductive track.

The heater may include a tube-shaped heating element, a plate-shaped heating element, a needle-shaped heating element, or a rod-shaped heating element, and may heat the inside or outside of a cigarette according to the shape of a heating element.

A cigarette may include a tobacco rod and a filter rod. The tobacco rod may be formed of sheets, strands, and tiny bits cut from a tobacco sheet. Also, the tobacco rod may be surrounded by a heat conductive material. For example, the heat conductive material may be, but is not limited to, a metal foil such as aluminum foil.

The filter rod may include a cellulose acetate filter. The filter rod may include at least one segment. For example, the filter rod may include a first segment configured to cool aerosols, and a second segment configured to filter a certain component in aerosols.

In another embodiment, the aerosol generating device may be a device that generates aerosols by using a cartridge containing an aerosol generating material.

The aerosol generating device may include a cartridge that contains an aerosol generating material, and a main body that supports the cartridge. The cartridge may be detachably coupled to the main body, but is not limited thereto. The cartridge may be integrally formed or assembled with the main body, and may also be fixed to the main body so as not to be detached from the main body by a user. The cartridge may be mounted on the main body while accommodating an aerosol generating material therein. However, the disclosure is not limited thereto. An aerosol generating material may also be injected into the cartridge while the cartridge is coupled to the main body.

The cartridge may contain an aerosol generating material in any one of various states, such as a liquid state, a solid state, a gaseous state, a gel state, or the like. The aerosol generating material may include a liquid composition. For example, the liquid composition may be a liquid including a tobacco-containing material having a volatile tobacco flavor component, or a liquid including a non-tobacco material.

The cartridge may be operated by an electrical signal or a wireless signal transmitted from the main body to perform a function of generating aerosols by converting the phase of an aerosol generating material inside the cartridge into a gaseous phase. The aerosols may refer to a gas in which vaporized particles generated from an aerosol generating material are mixed with air.

In another embodiment, the aerosol generating device may generate aerosols by heating a liquid composition, and the generated aerosols may be delivered to a user through a cigarette. That is, the aerosols generated from the liquid composition may move along an airflow passage of the aerosol generating device, and the airflow passage may be configured to allow aerosols to be delivered to a user by passing through a cigarette.

In another embodiment, the aerosol generating device may be a device that generates aerosols from an aerosol generating material by using an ultrasonic vibration method. At this time, the ultrasonic vibration method may mean a method of generating aerosols by converting an aerosol generating material into aerosols with ultrasonic vibration generated by a vibrator.

The aerosol generating device may include a vibrator, and generate a short-period vibration through the vibrator to convert an aerosol generating material into aerosols. The vibration generated by the vibrator may be ultrasonic vibration, and the frequency band of the ultrasonic vibration may be in a frequency band of about 100 kHz to about 3.5 MHz, but is not limited thereto.

The aerosol generating device may further include a wick that absorbs an aerosol generating material. For example, the wick may be arranged to surround at least one area of the vibrator, or may be arranged to contact at least one area of the vibrator.

As a voltage (for example, an alternating voltage) is applied to the vibrator, heat and/or ultrasonic vibrations may be generated by the vibrator, and the heat and/or ultrasonic vibrations generated by the vibrator may be transmitted to the aerosol generating material absorbed in the wick. The aerosol generating material absorbed in the wick may be converted into a gaseous phase by heat and/or ultrasonic vibrations transmitted from the vibrator, and as a result, aerosols may be generated.

For example, the viscosity of the aerosol generating material absorbed in the wick may be lowered by the heat generated by the vibrator, and as the aerosol generating material having a lowered viscosity is granulated by the ultrasonic vibrations generated from the vibrator, aerosols may be generated, but is not limited thereto.

In another embodiment, the aerosol generating device is a device that generates aerosols by heating an aerosol generating article accommodated in the aerosol generating device in an induction heating method.

The aerosol generating device may include a susceptor and a coil. In an embodiment, the coil may apply a magnetic field to the susceptor. As power is supplied to the coil from the aerosol generating device, a magnetic field may be formed inside the coil. In an embodiment, the susceptor may be a magnetic body that generates heat by an external magnetic field. As the susceptor is positioned inside the coil and a magnetic field is applied to the susceptor, the susceptor generates heat to heat an aerosol generating article. In addition, optionally, the susceptor may be positioned within the aerosol generating article.

In another embodiment, the aerosol generating device may further include a cradle.

The aerosol generating device may configure a system together with a separate cradle. For example, the cradle may charge a battery of the aerosol generating device. Alternatively, the heater may be heated when the cradle and the aerosol generating device are coupled to each other.

Hereinafter, the disclosure will now be described more fully with reference to the accompanying drawings, in which exemplary embodiments of the disclosure are shown such that one of ordinary skill in the art may easily work the disclosure. The disclosure may be implemented in a form that can be implemented in the aerosol generating devices of the various embodiments described above or may be implemented in various different forms, and is not limited to the embodiments described herein.

Hereinafter, embodiments of the disclosure will be described in detail with reference to the drawings.

FIG. 1 is a perspective view of an aerosol generating device according to an embodiment.

Referring to FIG. 1, an aerosol generating device 10 according to an embodiment may include a housing 100 into which an aerosol generating article 20 may be inserted, and a cover 110 coupled to an area of the housing 100.

The housing 100 may form the overall appearance of the aerosol generating device 10 together with the cover 110, and components of the aerosol generating device 10 may be arranged in an internal space formed between the housing 100 and the cover 110. For example, a heater, a printed circuit board and/or a battery may be arranged in the internal space formed between the housing 100 and the cover 110, but the components arranged in the internal space are not limited thereto.

In the drawing, a cross-section of the aerosol generating device 10 is a semicircular column shape, but the shape of the aerosol generating device 10 is not limited thereto. For example, the aerosol generating device 10 may be formed in a cylindrical shape as a whole, or may be formed in a polygonal pole (e.g., a triangular pole or a quadrangular pole) shape.

According to an embodiment, the housing 100 may include an accommodating space 100h for accommodating at least a portion of the aerosol generating article 20. The aerosol generating article 20 may be inserted (or accommodated) into the interior of the housing 100 through the accommodating space 100h, and the aerosol generating article 20 inserted into the interior of the housing 100 may be heated by a heater inside the housing 100.

Aerosols generated inside the housing 100 as the aerosol generating article 20 is heated may be discharged to the outside of the aerosol generating device 10 through the aerosol generating article 20 and/or a space between the aerosol generating article 20 and the accommodating space 100h, and a user may inhale the aerosols.

The cover 110 may be coupled to at least one area of the housing 100 to protect the components of the aerosol generating device 10, wherein the components are arranged in an internal space between the housing 100 and the cover 110. For example, the cover 110 may be coupled to at least one area of the housing 100 to protect the components (e.g., a printed circuit board) of the aerosol generating device 10 from external impact or the inflow of foreign substances.

The aerosol generating device 10 according to an embodiment may further include a display D on which visual information is displayed. At least a part of the display D may be exposed to the outside of the housing 100, and the aerosol generating device 10 may provide various pieces of visual information to the user through the display D.

For example, the aerosol generating device 10 may provide, through the display D, information on whether a puff action of the user has occurred and/or information on a remaining number of puffs of the aerosol generating article 20 which is inserted. However, information provided through the display D is not limited thereto.

In addition, the aerosol generating device 10 may control the operation of the aerosol generating device 10 based on a user input to the display D. For example, the aerosol generating device 10 may control whether a heater operates and/or a temperature profile of the heater based on a user input (e.g., a touch input) to the display D, but is not limited thereto.

FIG. 2 is an exploded perspective view of the aerosol generating device shown in FIG. 1.

Referring to FIG. 2, the aerosol generating device 10 (e.g., the aerosol generating device 10 of FIG. 1) according to an embodiment may include the housing 100 (e.g., the housing 100 of FIG. 1), the cover 110 (e.g., the cover 110 of FIG. 1), a printed circuit board 200, an electrical connection member 210, and a breaking structure 300. At least one of the components of the aerosol generating device 10 may be the same as or similar to at least one of the components of the aerosol generating device 10 shown in FIG. 1, and redundant descriptions are omitted below.

The cover 110 may be coupled to an area of the housing 100, and the components of the aerosol generating device 10 may be arranged in an internal space formed between the housing 100 and the cover 110. For example, the printed circuit board 200 may be arranged in the internal space formed between the housing 100 and the cover 110, but components arranged in the internal space are not limited thereto.

According to an embodiment, the cover 110 may include a conductive pad 120. The conductive pad 120 may be arranged in an area of the cover 110, the area facing the printed circuit board 200, and may be electrically connected to the printed circuit board 200 to operate as a ground (or 'ground layer'). For example, the conductive pad 120 may be electrically connected to the printed circuit board 200 through the electrical connection member 210 to keep noise generated during an operation of the aerosol generating device 10 or external noise from flowing into the printed circuit board 200.

In an embodiment, the conductive pad 120 may include a metal pad, but is not limited thereto. In another embodiment, the conductive pad 120 may also include a pad including non-metal materials having high conductivity.

The printed circuit board 200 may be arranged in the internal space formed between the housing 100 and the cover 110, and a processor (not shown) controlling the operation of the aerosol generating device 10 may be arranged or mounted in an area of the printed circuit board 200.

In an embodiment, the processor may be electrically or operatively connected to a heater and a battery to control power supplied from the battery to the heater, thereby controlling the temperature of the heater. In the disclosure, the expression 'operatively connected' may mean a state in which components are connected to transmit or receive signals through wireless communication, or to transmit or receive optical and/or magnetic signals, and the expression may be used in the same meaning below.

In another embodiment, the processor may be electrically or operatively connected to a sensor to detect a puff action of the user based on a detection result of the sensor. However, a control operation of the processor is not limited thereto, and a detailed control operation of the processor is described below.

The electrical connection member 210 may electrically connect the conductive pad 120 of the cover 110 to the printed circuit board 200. For example, as an area of the electrical connection member 210 is in contact with the conductive pad 120, and another area of the electrical connection member 210 is in contact with the printed circuit board 200, the conductive pad 120 may be electrically connected to the printed circuit board 200. As the conductive pad 120 is electrically connected to the printed circuit board 200, the printed circuit board 200 may be grounded to the conductive pad 120, and as a result, noise is kept from being introduced to the printed circuit board 200.

According to an embodiment, the electrical connection member 210 may include a conductive clip or a C-clip, but is not limited thereto. In another embodiment (not shown), the electrical connection member 210 may also include a wire, a flexible printed circuit board (FPCB), or a cable.

The breaking structure 300 may be arranged in an area of the cover 110, the area facing the printed circuit board 200. When the cover 110 is detached from the housing 100, the breaking structure 300 may damage at least an area of the electrical connection member 210. For example, the breaking structure 300 may damage the electrical connection member 210 by impacting an area of the electrical connection member 210 as the cover 110 is detached from the housing 100, and as a result, the conductive pad 120 may be electrically separated from the printed circuit board 200. In the disclosure, the expression 'electrically separated' may mean a state in which an electrical connection is released, and the expression may be used in the same meaning below.

The processor may detect whether the cover 110 is detached from the housing 100 based on a change in electrical characteristics according to an electrical connection status between the conductive pad 120 and the printed circuit board 200. When the cover 110 is detached, the processor may cease the operation of the aerosol generating device 10.

Recently, many users are disassembling and arbitrarily tuning (or 'custom tuning') an aerosol generating device to increase the amount of aerosol generation or increase the operating time of the aerosol generating device. In the case of an aerosol generating device which is arbitrarily tuned, safety problems, such as an excessive increase in the temperature of a heater or an explosion of the battery, may occur during operation of the aerosol generating device.

The aerosol generating device 10 according to an embodiment may detect whether the cover 110 is detached by damaging the electrical connection member 210 through the breaking structure 300 when the cover 110 is detached, and when the detachment of the cover 110 is detected, the aerosol generating device 10 may cease the operation of the aerosol generating device 10 to prevent a safety accident caused by arbitrary tuning by the user.

Hereinafter, referring to FIGS. 3A to 3C, a process, in which the electrical connection member 210 is damaged by the breaking structure 300 as the cover 110 is detached from the housing 100, is described.

FIG. 3A is a diagram showing a process in which a cover is coupled to a housing in an aerosol generating device according to an embodiment. FIG. 3A is a cross-sectional view of the aerosol generating device 10 shown in FIG. 2 taken in an A-A' direction, and redundant descriptions are omitted below.

Referring to FIG. 3A, the aerosol generating device 10 according to an embodiment may include the housing 100, the cover 110, the conductive pad 120, the printed circuit board 200, the electrical connection member 210, and the breaking structure 300.

The cover 110 may be coupled to an area of the housing 100, and the conductive pad 120, the printed circuit board 200, the electrical connection member 210, and the breaking structure 300 may be arranged in an internal space formed between the housing 100 and the cover 110 when the housing 100 is coupled to the cover 110.

As shown in FIG. 3A, the cover 110 may slide and move to be coupled to an area of the housing 100 such that the electrical connection member 210 is not damaged in a coupling operation of the housing 100 and the cover 110.

As the breaking structure 300 is formed to protrude from an area of the cover 110, the electrical connection member 210 may be damaged by the breaking structure 300 during a process in which the cover 110 is coupled to the housing 100. In the aerosol generating device 10 according to an embodiment, the cover 110 may slide and move such that the breaking structure 300 and the electrical connection member 210 do not come into contact in the coupling operation of the housing 100 and the cover 110, and thus, the electrical connection member 210 may be prevented from being damaged during the coupling operation.

As the housing 100 is coupled to the cover 110, an area of the electrical connection member 210 may be in contact with the printed circuit board 200, and another area of the electrical connection member 210 may be in contact with the conductive pad 120 arranged on the cover 110. As a result, the conductive pad 120 may be electrically connected to the printed circuit board 200.

The breaking structure 300 may be formed to protrude from an area of the cover 110 to perform a function of damaging the electrical connection member 210 when the cover 110 is detached. For example, the breaking structure 300 may be formed in a shape in which at least an area thereof is bent in a direction toward the electrical connection member 210. As a result, at least an area of the breaking structure 300 may be between the printed circuit board 200 and the electrical connection member 210 in a state in which the housing 100 is coupled to the cover 110.

According to an embodiment, the breaking structure 300 may include a first portion 310 extending from an area of the cover 110 in a first direction toward the printed circuit board 200, and a second portion 320 extending from an area of the first portion 310 in a second direction crossing the first direction. For example, the second portion 320 may extend from the area of the first portion 310 in a direction perpendicular to the first direction, but the shape of the breaking structure 300 is not limited thereto. In another embodiment (not shown), the second portion 320 may extend from an end of the first portion 310 in a direction forming a certain angle (e.g., about 60° to 80°) with the first direction.

The second portion 320 of the breaking structure 300 may be between the printed circuit board 200 and the electrical connection member 210 in a state in which the housing 100 is coupled to the cover 110. Due to the above-described arrangement structure, the second portion 320 of the breaking structure 300 may damage the electrical connection member 210 by impacting an area of the electrical connection member 210 as the cover 110 is detached from the housing 100, which will be described in detail with reference to FIG. 3B.

FIG. 3B is a diagram showing a process in which a cover is detached from a housing in an aerosol generating device according to an embodiment. FIG. 3B is a cross-sectional view schematically illustrating a process in which the cover 110 is detached from the housing 100 in the aerosol generating device 10 of FIG. 3A, and redundant descriptions are omitted below.

Referring to FIG. 3B, as the cover 110 starts to be detached or separated from the housing 100, at least an area of the breaking structure 300 may be in contact with the electrical connection member 210. For example, as the cover 110 moves in a direction away from the housing 100 by the detachment of the cover 110, the second portion 320 (e.g., the second portion 320 of FIG. 3A) of the breaking structure 300 may come in contact with an area 211 of the electrical connection member 210.

As the cover 110 moves further in a direction away from the housing 100 in a state in which the second portion 320 of the breaking structure 300 is in contact with the area 211 of the electrical connection member 210, pressure or stress may be applied to the area 211 of the electrical connection member 210. As a result, the area 211 of the electrical connection member 210 may be damaged by the second portion 320 of the breaking structure 300. For example, the area 211 of the electrical connection member 210 may be bent and damaged by pressure or stress by the second portion 320. For example, the area 211 may fall off from the rest of the electrical connection member 210, but the damage is not limited thereto.

FIG. 3C is a diagram showing a process in which a detached cover is re-coupled to a housing in an aerosol generating device according to an embodiment. FIG. 3C is a cross-sectional view schematically illustrating a state in which the cover 110 is re-coupled to the housing 100 after an area of the electrical connection member 210 is damaged by the detachment of the cover 110.

Referring to FIG. 3C, in the aerosol generating device 10 according to an embodiment, the electrical connection member 210 is damaged in a process in which the cover 110 is detached from the housing 100. Thus, even when the cover 110 is re-coupled to the housing 100, the conductive pad 120 and the printed circuit board 200 stay electrically separated from each other.

For example, as an area (e.g., the area 211 of FIG. 3B) of the electrical connection member 210 is damaged during the detachment operation of the cover 110, the electrical connection member 210 is not in contact with the conductive pad 120. As a result, even when the cover 110 is re-coupled to the housing 100, the conductive pad 120 and the printed circuit board 200 stay electrically separated from each other.

That is, the aerosol generating device 10 according to an embodiment causes the electrical connection member 210 to be damaged by the breaking structure 300 when the cover 110 is detached from the housing 100 even once. Thus, even when the cover 110 is re-coupled to the housing 100, the conductive pad 120 may not be electrically connected to the printed circuit board 200.

In addition, the processor of the aerosol generating device 10 according to an embodiment detects whether the cover 110 is detached based on a change in electrical characteristics of the conductive pad 120 and the printed circuit board 200 according to the damage of the electrical connection member 210, and ceases the operation of the aerosol generating device 10 when the cover 110 is detached. A detailed description of the control operation of the processor is provided below.

FIG. 4 is a diagram showing a process in which a cover is detached from a housing in an aerosol generating device according to another embodiment.

Referring to FIG. 4, the aerosol generating device 10 according to another embodiment may include the housing 100, the cover 110, the conductive pad 120, the printed circuit board 200, the electrical connection member 210, and the breaking structure 300. The aerosol generating device 10 according to another embodiment may be a device in which the shape of the breaking structure 300 in the aerosol generating device 10 shown in FIGS. 3A to 3C is modified, and redundant descriptions thereof are omitted below.

The breaking structure 300 may be formed to protrude from an area of the cover 110, the area facing the printed circuit board 200, and may damage the electrical connection member 210 connecting the conductive pad 120 of the cover 110 to the printed circuit board 200 when the cover 110 is detached from the housing 100.

The breaking structure 300 may be formed in a curved shape in which at least one area thereof is bent toward the electrical connection member 210. The at least one area of the breaking structure 300, which is bent toward the electrical connection member 210, may be between the printed circuit board 200 and the electrical connection member 210 in a state in which the housing 100 is coupled to the cover 110.

According to an embodiment, the breaking structure 300 may include the first portion 310 extending from an area of the cover 110 in a first direction toward the printed circuit board 200, and the second portion 320 bent from an area of the first portion 310 in a second direction crossing the first direction.

The second portion 320 of the breaking structure 300 may be between the printed circuit board 200 and the electrical connection member 210 in a state in which the housing 100 is coupled to the cover 110, and due to the above-described arrangement structure, the second portion 320 may damage the electrical connection member 210 in a process in which the cover 110 is detached from the housing 100. For example, the second portion 320 may come into contact of the area 211 of the electrical connection member 210 in a process in which the cover 110 is detached from the housing 100 and apply pressure or stress to the area 211 of the electrical connection member 210, thereby damaging the area 211 of the electrical connection member 210.

In the aerosol generating device 10 according to another embodiment, as the second portion 320 is formed to be bent from an area of the first portion 310 in a longitudinal direction (or the 'first direction') of the first portion 310, a fillet may be formed in a connection portion of the first portion 310 and the second portion 320. As a result, the electrical connection member 210 may be prevented from being damaged in the coupling operation of the housing 100 and the cover 110.

For example, if the connection portion of the first portion 310 and the second portion 320 is formed to have a sharp edge, as the electrical connection member 210 may come into contact with the connection portion of the first portion 310 and the second portion 320 in a process in which the cover 110 slides and moves for the coupling of the housing 100 and the cover 110, the electrical connection member 210 may be damaged. In this case, the operation of the aerosol generating device 10 may be ceased even though the cover 110 has never been detached from the housing 100.

In contrast, the aerosol generating device 10 according to another embodiment includes a structure in which a fillet is formed in the connection portion of the first portion 310 and the second portion 320, thereby preventing the electrical connection member 210 from being damaged in the coupling operation of the housing 100 and the cover 110. As a result, the aerosol generating device 10 may be prevented from ceasing its operation without the detachment of the cover 110.

FIG. 5 is a diagram showing process in which a cover is detached from a housing in an aerosol generating device according to another embodiment.

Referring to FIG. 5, the aerosol generating device 10 according to another embodiment may include the housing 100, the cover 110, the conductive pad 120, the printed circuit board 200, the electrical connection member 210, and the breaking structure 300. The aerosol generating device 10 according to another embodiment may be a device in which the shape of the breaking structure 300 in the aerosol generating device 10 shown in FIGS. 3A to 3C is modified, and redundant descriptions thereof are omitted below.

The breaking structure 300 may be formed to protrude from an area of the cover 110, the area facing the printed circuit board 200, and may damage the electrical connection member 210 connecting the conductive pad 120 of the cover 110 to the printed circuit board 200 when the cover 110 is detached from the housing 100.

According to an embodiment, the breaking structure 300 may include the first portion 310, the second portion 320, and a third portion 330.

The first portion 310 may extend from an area of the cover 110 in a first direction toward the printed circuit board 200. For example, the first portion 310 may extend from an area of the cover 110, the area facing the printed circuit board 200, in the first direction.

The second portion 320 may extend from an area of the first portion 310 in a second direction crossing the first direction in which the first portion 310 protrudes from the cover 110. For example, the second portion 320 may extend from an end of the first portion 310, the end being adjacent to the printed circuit board 200, in the second direction perpendicular to the first direction to be positioned between the printed circuit board 200 and the electrical connection member 210, but is not limited thereto.

The third portion 330 may extend from an area of the second portion 320 in a third direction crossing the second direction. For example, the third portion 330 may extend from an end of the second portion 320 in the third direction, which is perpendicular to the second direction and parallel to the first direction, to be positioned between the printed circuit board 200 and the electrical connection member 210, but is not limited thereto.

That is, due to the above-described arrangement structure of the first portion 310, the second portion 320, and the third portion 330, the breaking structure 300 may be formed in a "⊏" shape when viewed from the side. The second portion 320 and the third portion 330 of the breaking structure 300 may be positioned between the printed circuit board 200 and the electrical connection member 210 to damage the area 211 of the electrical connection member 210 when the cover 110 is detached.

As shown in FIG. 5, the second portion 320 and the third portion 330 of the breaking structure 300 according to an embodiment may be in physical contact with area 211 of the electrical connection member 210 when the cover 110 is detached from the housing 100, thereby damaging the area 211 of the electrical connection member 210.

For example, the area 211 of the electrical connection member 210 may be in contact with a connection area between the second portion 320 and the third portion 330 when the cover 110 is detached, and the second portion 320 and the third portion 330 may apply pressure or stress to the area 211 of the electrical connection member 210 to damage to area 211 of the electrical connection member 210.

Another embodiment, a contact area between the electrical connection member 210 and the breaking structure 300 may increase as the cover 110 is detached. As a result, the aerosol generating device 10 may effectively damage the electrical connection member 210 when the cover 110 is detached. Accordingly, the accuracy of detecting whether the cover 110 is detached may be improved.

FIG. 6 is a diagram showing a process in which a cover is detached from a housing in an aerosol generating device according to another embodiment.

Referring to FIG. 6, the aerosol generating device 10 according to another embodiment may include the housing 100, the cover 110, the conductive pad 120, the printed circuit board 200, the electrical connection member 210, and the breaking structure 300. The aerosol generating device 10 according to another embodiment may be a device in which the shape of the third portion 330 of the breaking structure 300 in the aerosol generating device 10 shown in FIG. 5 is modified, and redundant descriptions thereof are omitted below.

The third portion 330 of the breaking structure 300 may include a tip portion that is in contact with the area 211 of the electrical connection member 210. In the disclosure, 'tip portion (or 'cutting-edge portion')' may mean a portion having a sharp tip, and the expression may be used in the same meaning hereinafter.

According to an embodiment, the tip portion may be formed in an area of the third portion 330, the area being in contact with the electrical connection member 210 when the cover 110 is detached, and may damage the area 211 of the electrical connection member 210. For example, the tip portion of the third portion 330 may be in physical contact with the area 211 of the electrical connection member 210 when the cover 110 is detached to apply pressure or stress to the area 211 of the electrical connection member 210, thereby damaging the area 211 of the electrical connection member 210.

The aerosol generating device 10 according to another embodiment may include the breaking structure 300 described above, which allows the electrical connection member 210 to be in contact with the sharp tip portion of the breaking structure 300 when the cover 110 is detached. As the electrical connection member 210 is in contact with the sharp tip portion of the breaking structure 300, the electrical connection member 210 may be applied with a greater pressure or stress compared to a case where the electrical connection member 210 is in contact with a flat portion of the breaking structure 300. As a result, the aerosol generating device 10 may more effectively damage the electrical connection member 210 when the cover 110 is detached, thereby increasing the accuracy of detecting whether the cover 110 is detached.

FIG. 7 is a block diagram showing some components of an aerosol generating device according to an embodiment.

Referring to FIG. 7, the aerosol generating device 10 according to an embodiment may include a heater 101, the conductive pad 120, the printed circuit board 200, the electrical connection member 210, and a processor 220. At least one of the components of the aerosol generating device 10 according to an embodiment may be substantially the same as or similar to the components of the aerosol generating device 10 shown in FIGS. 3A to 6, and redundant descriptions thereof are omitted below.

The heater 101 may generate heat as power is supplied from a battery to heat an aerosol generating article (e.g., the aerosol generating article 20 of FIG. 1) inserted into the aerosol generating device 10 to generate aerosols.

In an embodiment, the heater 101 may include an induction heater. For example, the heater 101 may include a coil (or 'electrically conductive coil') that generates an alternating magnetic field as power is supplied, and a susceptor that generates heat by the alternating magnetic field generated by the coil. The susceptor may be arranged to surround an aerosol generating article inserted into the aerosol generating device 10 or may be inserted inside an aerosol generating article to heat the aerosol generating article.

In another embodiment, the heater 101 may include an electro-resistive heater. For example, the heater 101 may include a film heater arranged to surround at least a portion of an outer peripheral surface of an aerosol generating article inserted into the aerosol generating device 10. The film heater may include an electrically conductive track, and when an electric current flows through the electrically conductive track, the heater may generate heat to heat an aerosol generating article inserted into the aerosol generating device 10.

In another embodiment, the heater 101 may include at least one of a needle-shaped heater, a rod-shaped heater, and a tube-shaped heater, which may heat the inside of an aerosol generating article inserted into the aerosol generating device 10. The heater described above may be inserted into, for example, at least one area of an aerosol generating article to heat the inside of the aerosol generating article.

The heater 101 of the disclosure is not limited thereto, and the embodiment of a heater may be varied as long as an aerosol generating article may be heated to a designated temperature. In the disclosure, the 'designated temperature' may mean a temperature at which an aerosol generating material included in the aerosol generating article 20 may be heated to generate aerosols. The designated temperature may a temperature preset in the aerosol generating device 10, but the temperature may be changed by the type of the aerosol generating device 10 and/or the user's manipulation.

The display D may be arranged such that at least one area thereof is exposed to the outer peripheral surface of the aerosol generating device 10, and may output visual information and receive a user input.

In an embodiment, the display D may output information on whether a puff action of the user has occurred and/or visual information about a remaining number of puffs of an aerosol generating article inserted into the aerosol generating device 10, but the visual information output by the display D is not limited thereto.

In another embodiment, the aerosol generating device 10 may receive a user input to the display D, and may control the operation of the aerosol generating device 10 based on the received user input. For example, the aerosol generating device 10 may control an operation mode of the aerosol generating device 10, whether the heater 101 operations and/or a temperature profile of the heater 101, or the like based on a user input to the display D. In addition, in the disclosure, 'user input' may include a touch input and/or a hovering input, but the type of the user input is not limited thereto.

The processor 220 may be arranged or mounted on an area of the printed circuit board 200, and may control the overall operation of the aerosol generating device 10.

According to an embodiment, the processor 220 may be electrically or operatively connected to the heater 101 and/or the display D to control power supplied from a battery to the heater 101 or to control visual information output by the display D.

According to another embodiment, the processor 220 may detect a change in electrical characteristics between the conductive pad 120 of a cover (e.g., the cover 110 of FIG. 3A) and the printed circuit board 200, and may detect whether the cover is detached based on the change in electrical characteristics between the conductive pad 120 and the printed circuit board 200.

For example, when the cover is detached from a housing (e.g., the housing 100 of FIG. 3A), an area of the electrical connection member 210 electrically connecting the conductive pad 120 to the printed circuit board 200 may be damaged by a breaking structure (e.g., the breaking structure 300 of FIGS. 3A to 6). As a result, an electrical connection between the conductive pad 120 and the printed circuit board 200 may be released.

The processor 220 may detect whether a cover is detached based on a change in electrical characteristics between the conductive pad 120 and the printed circuit board 200 according to the damage of the electrical connection member 210, and may cease the operation of the aerosol generating device 10 when the detachment of the cover is detected.

The aerosol generating device 10 according to an embodiment may not resume the operation of the aerosol generating device 10 even when the cover is re-coupled to the housing once the detachment of the cover is detected. As a result, the occurrence of a safety accident due to arbitrary tuning on the aerosol generating device 10 by the user may be prevented. Hereinafter, an operation in which the processor 220 detects the detachment of a cover and controls the operation of the aerosol generating device 10 according to a detection result is described in detail below with reference to FIG. 8.

FIG. 8 is a flowchart illustrating a control operation based on whether a cover of the aerosol generating device of FIG. 7 is detached. Hereinafter, a description of a control operation based on whether a cover of an aerosol generating device is detached in FIG. 8 is made with reference to the components of the aerosol generating device 10 shown in FIG. 7.

Referring to FIG. 8, in operation 801, the processor 220 of the aerosol generating device 10 according to an embodiment may detect a change in electrical characteristics between the conductive pad 120 and the printed circuit board 200.

When the conductive pad 120 is electrically connected to the printed circuit board 200 through the electrical connection member 210 and then an electrical connection relationship between the conductive pad 120 and the printed circuit board 200 is released, the electrical characteristics between the conductive pad 120 and the printed circuit board 200 are changed.

In an embodiment, when the electrical connection member 210 is damaged by a breaking structure (e.g., the breaking structure 300 of FIGS. 3A to 6) as a cover (e.g., the cover 110 of FIG. 3A) is detached from a housing (e.g., the housing 100 of FIG. 3A), and an electrical connection between the conductive pad 120 and the printed circuit board 200 is released. As a result, a change in the magnitude of a voltage or current applied to the printed circuit board 200 may occur.

Then, the processor 220 arranged in the printed circuit board 200 may detect a change in the magnitude of a voltage or current applied to the printed circuit board 200. However, a change in electrical characteristics of the conductive pad 120 and the printed circuit board 200 is not limited to a change in current or voltage. In another embodiment, as a cover is detached, a change in capacitance of the printed circuit board 200 may occur, and the processor 220 may detect a change in capacitance of the printed circuit board 200.

In operation 802, the processor 220 of the aerosol generating device 10 according to an embodiment may detect a coupling state of the cover and the housing, based on the change in electrical characteristics between the conductive pad 120 and the printed circuit board 200, which is detected in operation 801. For example, the processor 220 may detect whether the cover is coupled to or detached from the housing, based on a change in electrical characteristics between the conductive pad 120 and the printed circuit board 200.

According to an embodiment, the processor 220 may determine that the electrical connection between the conductive pad 120 and the printed circuit board 200 is released due to the damage of the electrical connection member 210 when an amount of change in current or voltage applied to the printed circuit board 200 is greater than or equal to a designated value. Accordingly, the processor 220 may determine that the cover is detached from the housing. In the disclosure, the 'designated value' may mean a value of an amount of change in current or voltage applied to the printed circuit board 200, which is a standard for determining whether a cover is detached. For example, when the cover is detached from the housing, the amount of change in current or voltage applied to the printed circuit board 200 may be greater than or equal to the designated value.

According to another embodiment, the processor 220 may determine that a change in current or voltage is detected due to noise when an amount of change in current or voltage applied to the printed circuit board 200 is less than a designated value. Accordingly, the processor 220 may determine that the cover is coupled to the housing.

In operation 803, the processor 220 of the aerosol generating device 10 according to an embodiment may determine whether the detachment of the cover is detected in operation 802. Because an operation of detaching a cover from a housing is required before arbitrary tuning of the aerosol generating device 10, such as replacing a battery or increasing a heating temperature of the heater 101, the processor 220 may determine whether arbitrary tuning is performed based on whether the detachment of the cover is detected.

In operation 804, the processor 220 of the aerosol generating device 10 according to an embodiment may cease the operation of the aerosol generating device 10 when the detachment of the cover is detected in operation 803.

In the case of the aerosol generating device 10 which is arbitrarily tuned, a safety accident is likely to occur, such as an excessively high temperature rise of a heater or an explosion of a battery during operation. The processor 220 may prevent the occurrence of a safety accident due to the user's arbitrary tuning by ceasing the operation of the aerosol generating device 10 when the detachment of the cover is detected.

According to an embodiment, the processor 220 may cease the operation of the heater 101 when the detachment of the cover is detected. For example, if the detachment of the cover is detected, the processor 220 may prevent the occurrence of safety accidents due to the user's arbitrary tuning by ceasing the operation of the heater 101 even when an aerosol generating article (e.g., the aerosol generating article 20 of FIG. 1) is inserted into the aerosol generating device 10.

According to another embodiment, if the detachment of the cover is detected, the processor 220 may cease the operation of the aerosol generating device 10 even when a user input to the display D is received. For example, the processor 220 may not change an operation mode of the aerosol generating device 10 even when a user input for changing the operation mode of the aerosol generating device 10 is received.

On the other hand, when it is detected that the cover is coupled to the housing in operation 803, the processor 220 of the aerosol generating device 10 may repeat operations 801 to 803 to continuously detect whether the cover is detached.

The aerosol generating device 10 according to an embodiment may cease the operation of the aerosol generating device 10 upon detection of detachment of the cover through operations 801 to 804 described above, thereby preventing the occurrence of safety accidents due to the user's arbitrary tuning. In addition, the aerosol generating device 10 according to an embodiment may prevent arbitrary tuning by the user through operations 801 to 804 described above, thereby stably maintaining the performance of the aerosol generating device 10.

FIG. 9 is a block diagram of an aerosol generating device according to another embodiment.

An aerosol generating device 900 may include a controller 910 (or processor), a sensing unit 920, an output unit 930, a battery 940, a heater 950, a user input unit 960, a memory 970, and a communication unit 980. However, the internal structure of the aerosol generating device 900 is not limited to those illustrated in FIG. 9. That is, according to the design of the aerosol generating device 900, it will be understood by one of ordinary skill in the art that some of the components shown in FIG. 9 may be omitted or new components may be added.

The sensing unit 920 may sense a state of the aerosol generating device 900 and a state around the aerosol generating device 900, and transmit sensed information to the controller 910. Based on the sensed information, the controller 910 may control the aerosol generating device 900 to perform various functions, such as controlling an operation of the heater 950, limiting smoking, determining whether an aerosol generating article (e.g., a cigarette, a cartridge, or the like) is inserted, displaying a notification, or the like.

The sensing unit 920 may include at least one of a temperature sensor 922, an insertion detection sensor 924, and a puff sensor 926, but is not limited thereto.

The temperature sensor 922 may sense a temperature at which the heater 950 (or an aerosol generating material) is heated. The aerosol generating device 900 may include a separate temperature sensor for sensing the temperature of the heater 950, or the heater 950 may serve as a temperature sensor. Alternatively, the temperature sensor 922 may also be arranged around the battery 940 to monitor the temperature of the battery 940.

The insertion detection sensor 924 may sense insertion and/or removal of an aerosol generating article. For example, the insertion detection sensor 924 may include at least one of a film sensor, a pressure sensor, an optical sensor, a resistive sensor, a capacitive sensor, an inductive sensor, and an infrared sensor, and may sense a signal change according to the insertion and/or removal of an aerosol generating article.

The puff sensor 926 may sense a user's puff on the basis of various physical changes in an airflow passage or an airflow channel. For example, the puff sensor 926 may sense a user's puff on the basis of any one of a temperature change, a flow change, a voltage change, and a pressure change.

The sensing unit 920 may further include, in addition to the temperature sensor 922, the insertion detection sensor 924, and the puff sensor 926 described above, at least one of a temperature/humidity sensor, a barometric pressure sensor, a magnetic sensor, an acceleration sensor, a gyroscope sensor, a location sensor (e.g., a global positioning system (GPS)), a proximity sensor, and a red-green-blue (RGB) sensor (illuminance sensor). Because a function of each of sensors may be intuitively inferred by one of ordinary skill in the art from the name of the sensor, a detailed description thereof may be omitted.

The output unit 930 may output information on a state of the aerosol generating device 900 and provide the information to a user. The output unit 930 may include at least one of a display unit 932, a haptic unit 934, and a sound output unit 936, but is not limited thereto. When the display unit 932 and a touch pad form a layered structure to form a touch screen, the display unit 932 may also be used as an input device in addition to an output device.

The display unit 932 may visually provide information about the aerosol generating device 900 to the user. For example, information about the aerosol generating device 900 may mean various pieces of information, such as a charging/discharging state of the battery 940 of the aerosol generating device 900, a preheating state of the heater 950, an insertion/removal state of an aerosol generating article, or a state in which the use of the aerosol generating device 900 is restricted (e.g., sensing of an abnormal object), or the like, and the display unit 932 may output the information to the outside. The display unit 932 may be, for example, a liquid crystal display panel (LCD), an organic light-emitting diode (OLED) display panel, or the like. In addition, the display unit 932 may be in the form of a light-emitting diode (LED) light-emitting device.

The haptic unit 934 may tactilely provide information about the aerosol generating device 900 to the user by converting an electrical signal into a mechanical stimulus or an electrical stimulus. For example, the haptic unit 934 may include a motor, a piezoelectric element, or an electrical stimulation device.

The sound output unit 936 may audibly provide information about the aerosol generating device 900 to the user. For example, the sound output unit 936 may convert an electrical signal into a sound signal and output the same to the outside.

The battery 940 may supply power used to operate the aerosol generating device 900. The battery 940 may supply power such that the heater 950 may be heated. In addition, the battery 940 may supply power required for operations of other components (e.g., the sensing unit 920, the output unit 930, the user input unit 960, the memory 970, and the communication unit 980) in the aerosol generating device 900. The battery 940 may be a rechargeable battery or a disposable battery. For example, the battery 940 may be a lithium polymer (LiPoly) battery, but is not limited thereto.

The heater 950 may receive power from the battery 940 to heat an aerosol generating material. Although not illustrated in FIG. 9, the aerosol generating device 900 may further include a power conversion circuit (e.g., a direct current (DC)/DC converter) that converts power of the battery 940 and supplies the same to the heater 950. In addition, when the aerosol generating device 900 generates aerosols in an induction heating method, the aerosol generating device 900 may further include a DC/alternating current (AC) converter that converts DC power of the battery 940 into AC power.

The controller 910, the sensing unit 920, the output unit 930, the user input unit 960, the memory 970, and the communication unit 980 may each receive power from the battery 940 to perform a function. Although not illustrated in FIG. 9, the aerosol generating device 900 may further include a power conversion circuit that converts power of the battery 940 to supply the power to respective components, for example, a low dropout (LDO) circuit, or a voltage regulator circuit.

In an embodiment, the heater 950 may include any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, or the like, but is not limited thereto. In addition, the heater 950 may be implemented by a metal wire, a metal plate on which an electrically conductive track is arranged, a ceramic heating element, or the like, but is not limited thereto.

In another embodiment, the heater 950 may be a heater of an induction heating type. For example, the heater 950 may include a susceptor that heats an aerosol generating material by generating heat through a magnetic field applied by a coil.

The user input unit 960 may receive information input from the user or may output information to the user. For example, the user input unit 960 may include a key pad, a dome switch, a touch pad (a contact capacitive method, a pressure resistance film method, an infrared sensing method, a surface ultrasonic conduction method, an integral tension measurement method, a piezo effect method, or the like), a jog wheel, a jog switch, or the like, but is not limited thereto. In addition, although not illustrated in FIG. 9, the aerosol generating device 900 may further include a connection interface, such as a universal serial bus (USB) interface, and may be connected to other external devices through the connection interface, such as the USB interface, to transmit and receive information, or to charge the battery 940.

The memory 970 is a hardware component that stores various types of data processed in the aerosol generating device 900, and may store data processed and data to be processed by the controller 910. The memory 970 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The memory 970 may store an operation time of the aerosol generating device 900, the maximum number of puffs, the current number of puffs, at least one temperature profile, data on a user's smoking pattern, etc.

The communication unit 980 may include at least one component for communication with another electronic device. For example, the communication unit 980 may include a short-range wireless communication unit 982 and a wireless communication unit 984.

The short-range wireless communication unit 982 may include a Bluetooth communication unit, a Bluetooth Low Energy (BLE) communication unit, a near field communication unit, a wireless LAN (WLAN) (Wi-Fi) communication unit, a Zigbee communication unit, an infrared data association (IrDA) communication unit, a Wi-Fi Direct (WFD) communication unit, an ultra wideband (UWB) communication unit, an Ant+ communication unit, or the like, but is not limited thereto.

The wireless communication unit 984 may include a cellular network communication unit, an Internet communication unit, a computer network (e.g., local area network (LAN) or wide area network (WAN)) communication unit, or the like, but is not limited thereto. The wireless communication unit 984 may also identify and authenticate the aerosol generating device 900 within a communication network by using subscriber information (e.g., International Mobile Subscriber Identifier (IMSI)).

The controller 910 may control the overall operation of the aerosol generating device 900. In an embodiment, the controller 910 may include at least one processor. The processor may be implemented as an array of a plurality of logic gates, or may be implemented as a combination of a general-purpose microprocessor and a memory in which a program executable by the microprocessor is stored. It will be understood by one of ordinary skill in the art that the processor may be implemented in other forms of hardware.

The controller 910 may control the temperature of the heater 950 by controlling supply of power of the battery 940 to the heater 950. For example, the controller 910 may control power supply by controlling switching of a switching element between the battery 940 and the heater 950. In another embodiment, a direct heating circuit may also control power supply to the heater 950 according to a control command of the controller 910.

The controller 910 may analyze a result sensed by the sensing unit 920 and control subsequent processes to be performed. For example, the controller 910 may control power supplied to the heater 950 to start or end an operation of the heater 950 on the basis of a result sensed by the sensing unit 920. In another embodiment, the controller 910 may control, based on a result sensed by the sensing unit 920, an amount of power supplied to the heater 950 and the time the power is supplied, such that the heater 950 may be heated to a certain temperature or maintained at an appropriate temperature.

The controller 910 may control the output unit 930 on the basis of a result sensed by the sensing unit 920. For example, when the number of puffs counted through the puff sensor 926 reaches a preset number, the controller 910 may notify the user that the aerosol generating device 900 will soon be terminated through at least one of the display unit 932, the haptic unit 934, and the sound output unit 936.

In an embodiment, the controller 910 may control the time of power supply and/or amount of power supply to the heater 950 according to a state of an aerosol generating article (e.g., the aerosol generating article 20 of FIG. 1) sensed by the sensing unit 920. For example, when the aerosol generating article 20 is in an over-wet state, the controller 910 may control the time of power supply to an induction coil to increase the pre-heating time of the aerosol generating article 20 compared to a general condition.

One embodiment may also be implemented in the form of a computer-readable recording medium including instructions executable by a computer, such as a program module executable by the computer. The computer-readable recording medium may be any available medium that may be accessed by a computer, and includes both volatile and nonvolatile media, and removable and non-removable media. In addition, the computer-readable recording medium may include both a computer storage medium and a communication medium. The computer storage medium includes all of volatile and nonvolatile media, and removable and non-removable media implemented by any method or technology for storage of information such as computer-readable instructions, data structures, program modules, or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
a housing comprising an accommodating space for accommodating an aerosol generating article, and a heater configured to heat the aerosol generating article;
a cover coupled to the housing and comprising a conductive pad;
a printed circuit board disposed in an internal space formed by the housing and the cover;
an electrical connection member configured to electrically connect the conductive pad and the printed circuit board; and
a breaking structure arranged on the cover and configured to damage the electrical connection member when the cover is detached from the housing.

2. The aerosol generating device of claim 1, wherein the breaking structure protrudes from an area of the cover in a direction toward the printed circuit board, and damages the electrical connection member by impacting the electrical connection member when the cover is detached from the housing.

3. The aerosol generating device of claim 1, wherein the breaking structure has a bent shape that is bent in a direction toward the electrical connection member.

4. The aerosol generating device of claim 1, wherein the breaking structure has a curved shape that is bent in a direction toward the electrical connection member.

5. The aerosol generating device of claim 1, wherein the breaking structure comprises:
a first portion extending from the cover in a first direction toward the printed circuit board; and
a second portion extending from an end of the first portion in a second direction crossing the first direction, and configured to damage the electrical connection member by impacting the electrical connection member when the cover is detached.

6. The aerosol generating device of claim 5, wherein the breaking structure further comprises a third portion protruding from an end of the second portion in a third direction crossing the second direction, and configured to damage the electrical connection member by impacting the electrical connection member when the cover is detached.

7. The aerosol generating device of claim 6, wherein the third portion comprises a tip portion that comes into contact with the electrical connection member when the cover is detached.

8. The aerosol generating device of claim 1, wherein the electrical connection member comprises a conductive clip having an area in contact with the conductive pad and another area in contact with the printed circuit board.

9. The aerosol generating device of claim 1, wherein the conductive pad operates as a ground while being electrically connected to the printed circuit board.

10. The aerosol generating device of claim 1, wherein the heater comprises:

a coil configured to generate an alternating magnetic field; and a susceptor configured to generate heat in response to the alternating magnetic field generated by the coil.

11. The aerosol generating device of claim 1, further comprising:

a processor arranged on the printed circuit board, and configured to detect whether the cover is detached, based on a change in electrical characteristics between the printed circuit board and the conductive pad according to damage of the electrical connection member.

12. The aerosol generating device of claim 11, wherein the processor is further configured to detect whether the cover is detached, based on a change in current or voltage applied to the printed circuit board.

13. The aerosol generating device of claim 12, wherein the processor is further configured to determine that the cover is detached from the housing, when an amount of change in current or voltage applied to the printed circuit board is greater than or equal to a designated value.

14. The aerosol generating device of claim 11, wherein the processor is further configured to cease operation of the aerosol generating device when detachment of the cover is detected.

15. The aerosol generating device of claim 14, wherein the processor is further configured to cease operation of the heater when the detachment of the cover is detected.

* * * * *